(12) United States Patent
Tsubakihara et al.

(10) Patent No.: US 11,885,963 B2
(45) Date of Patent: Jan. 30, 2024

(54) HEAD-UP DISPLAY DEVICE

(71) Applicant: Yazaki Corporation, Tokyo (JP)

(72) Inventors: Naoto Tsubakihara, Shizuoka (JP); Kunikazu Takahashi, Shizuoka (JP); Yusuke Fujimoto, Shizuoka (JP); Takehisa Fukunaga, Shizuoka (JP); Yasuhiro Katsumata, Shizuoka (JP); Katsuyoshi Itahana, Shimada (JP); Kohji Matsuura, Shimada (JP); Keita Mochizuki, Shimada (JP); Masahiro Yoshida, Shimada (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/668,943

(22) Filed: Feb. 10, 2022

(65) Prior Publication Data
US 2022/0260835 A1 Aug. 18, 2022

(30) Foreign Application Priority Data

Feb. 15, 2021 (JP) ................................. 2021-021377

(51) Int. Cl.
*G02B 27/01* (2006.01)
*B60K 35/00* (2006.01)

(52) U.S. Cl.
CPC ..... *G02B 27/0149* (2013.01); *G02B 27/0101* (2013.01); *B60K 35/00* (2013.01); *B60K 2370/1529* (2019.05); *B60K 2370/23* (2019.05); *B60K 2370/67* (2019.05); *G02B 2027/0159* (2013.01)

(58) Field of Classification Search
CPC ... G02B 27/01–0189; G02B 2027/0105–0198; G02B 27/00–648; B60K 35/00; B60K 2370/00–98
See application file for complete search history.

(56) References Cited

U.S. PATENT DOCUMENTS

2015/0286054 A1 10/2015 Ushida et al.
2019/0285889 A1* 9/2019 Ogura ................ G02B 19/0009

FOREIGN PATENT DOCUMENTS

JP 2014-085539 A 5/2014

* cited by examiner

*Primary Examiner* — Bao-Luan Q Le
*Assistant Examiner* — Christopher A Lamb, II
(74) *Attorney, Agent, or Firm* — Sughrue Mion, PLLC

(57) ABSTRACT

A head-up display device includes an image display device that outputs display light of an image; a mirror having a reflecting surface that reflects the display light toward a reflecting portion, and an input shaft; a motor that has an output shaft located on an extended line of the input shaft, and rotates the output shaft; a transmission member that has a cylindrical fitting portion to which the input shaft is press-fitted and a coupling portion coupled with the output shaft and transmitting output torque of the motor from the output shaft to the input shaft; a holding member that holds the motor; and a first spring that is interposed between the holding member and the transmission member, and imparts, to the transmission member, a biasing force oriented to bring the mirror close to the output shaft.

4 Claims, 8 Drawing Sheets

HEAD-UP DISPLAY DEVICE

CROSS-REFERENCE TO RELATED APPLICATION(S)

The present application claims priority to and incorporates by reference the entire contents of Japanese Patent Application No. 2021-021377 filed in Japan on Feb. 15, 2021.

BACKGROUND OF THE INVENTION

1. Field of the Invention

The present invention relates to a head-up display device.

2. Description of the Related Art

Conventionally, there have been head-up display devices. In Japanese Patent Application Laid-open No. 2014-85539, a head-up display device is disclosed in which display light that represents a predetermined image emitted from a display device is reflected by a reflecting portion and, by the display light reflected by the reflecting portion, the image is made to be visually recognized.

In regard to downsizing head-up display devices, there still has been room for improvement. For example, if a torque transmission mechanism including from a motor to a mirror can be simplified, that leads to downsizing the head-up display devices. For example, if the number of components from the motor to the mirror is reduced, that leads to downsizing the head-up display devices.

SUMMARY OF THE INVENTION

An object of the present invention is to provide a head-up display device capable of achieving downsizing.

In order to achieve the above mentioned object, a head-up display device according to one aspect of the present invention includes an image display device configured to output display light of an image; a rotatable mirror having a reflecting surface configured to reflect the display light toward a reflecting portion arranged in front of a driver, and an input shaft; a motor having an output shaft located on an extended line of the input shaft, the motor being configured to rotate the output shaft; a transmission member having a cylindrical fitting portion to which the input shaft is press-fitted and a coupling portion coupled with the output shaft, the transmission member being configured to transmit output torque of the motor from the output shaft to the input shaft; a holding member holding the motor; and a first spring interposed between the holding member and the transmission member, the first spring being configured to impart, to the transmission member, a biasing force oriented to bring the mirror close to the output shaft along an axial direction of the input shaft.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

The following describes in detail a head-up display device according to an exemplary embodiment of the present invention with reference to the accompanying drawings. The invention, however, is not intended to be limited by the embodiment. The constituent elements in the following embodiment include elements easily achieved by a person skilled in the art or elements being substantially the same as the constituent elements.

Embodiment

Figure 1:
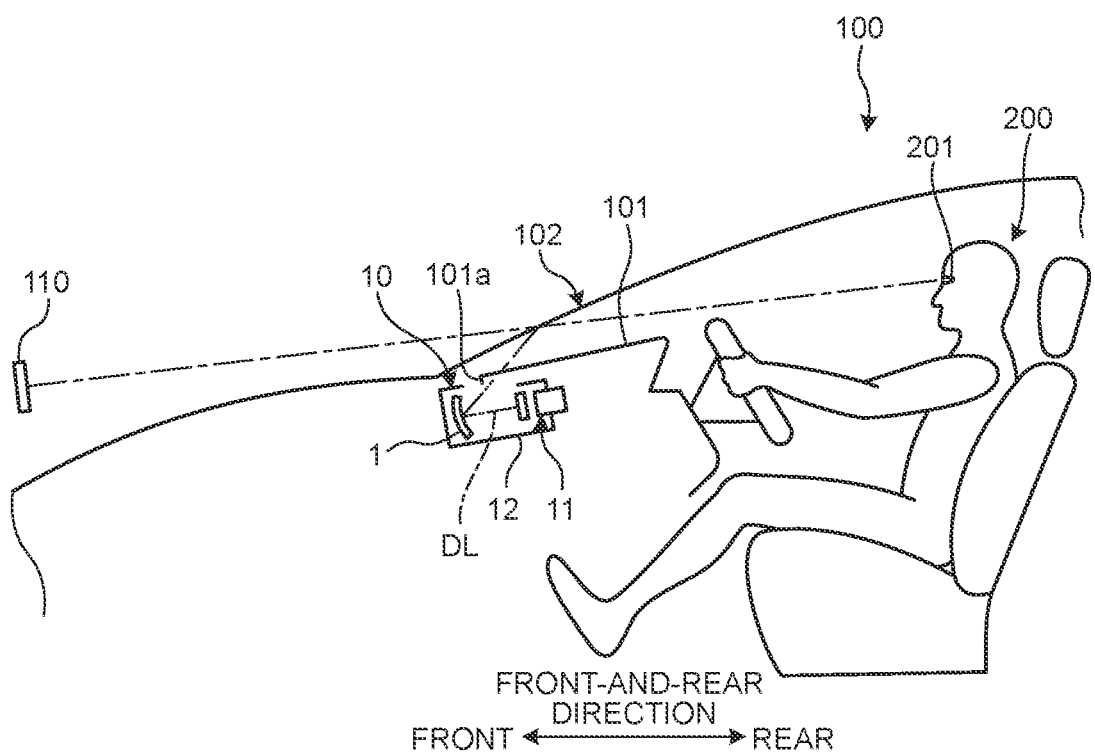
FIG. 1 is a diagram illustrating a vehicle in which a head-up display device of an embodiment is installed.
Figure 2:
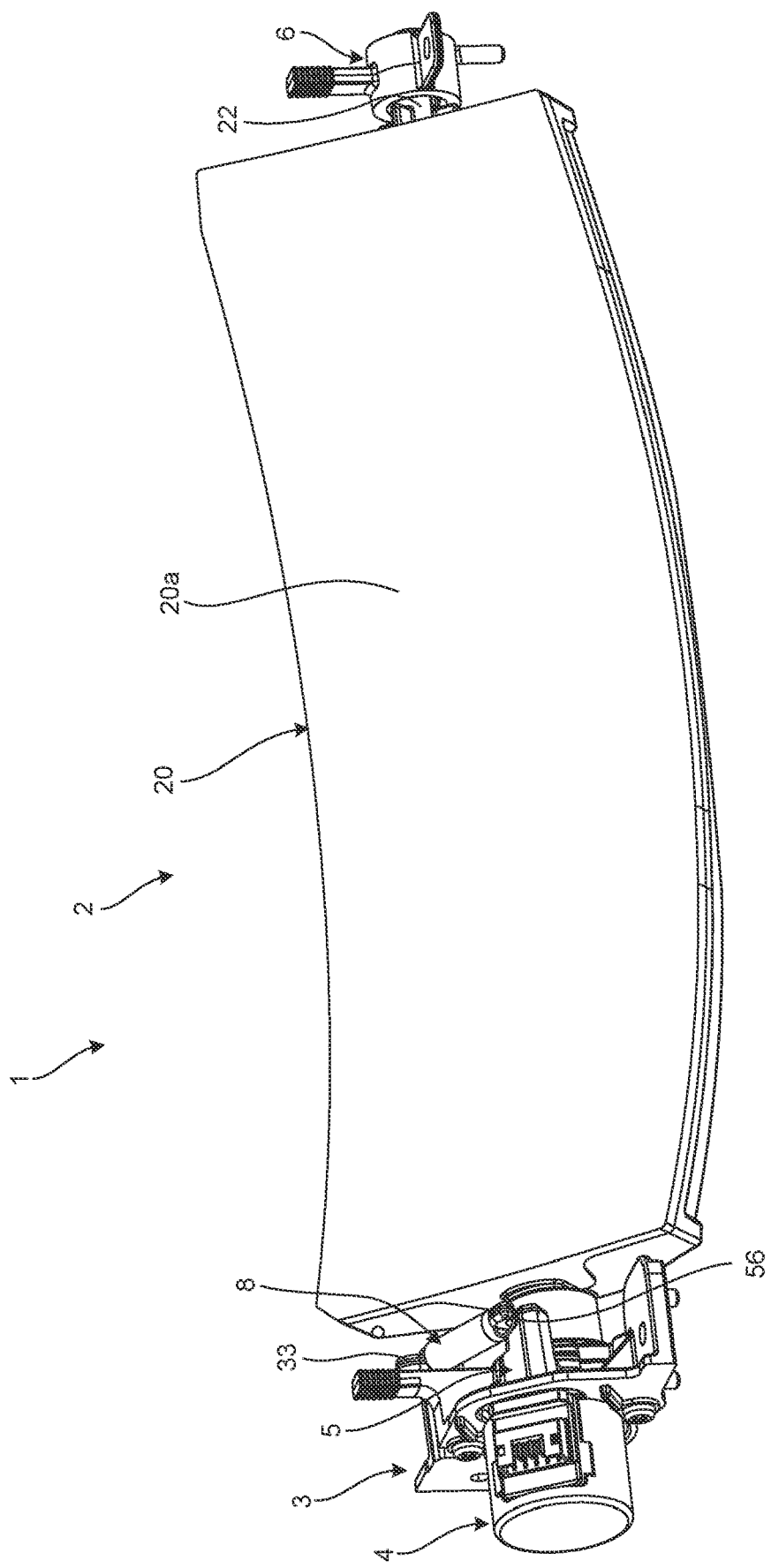
FIG. 2 is a perspective view illustrating a mirror device of the embodiment.
Figure 3:
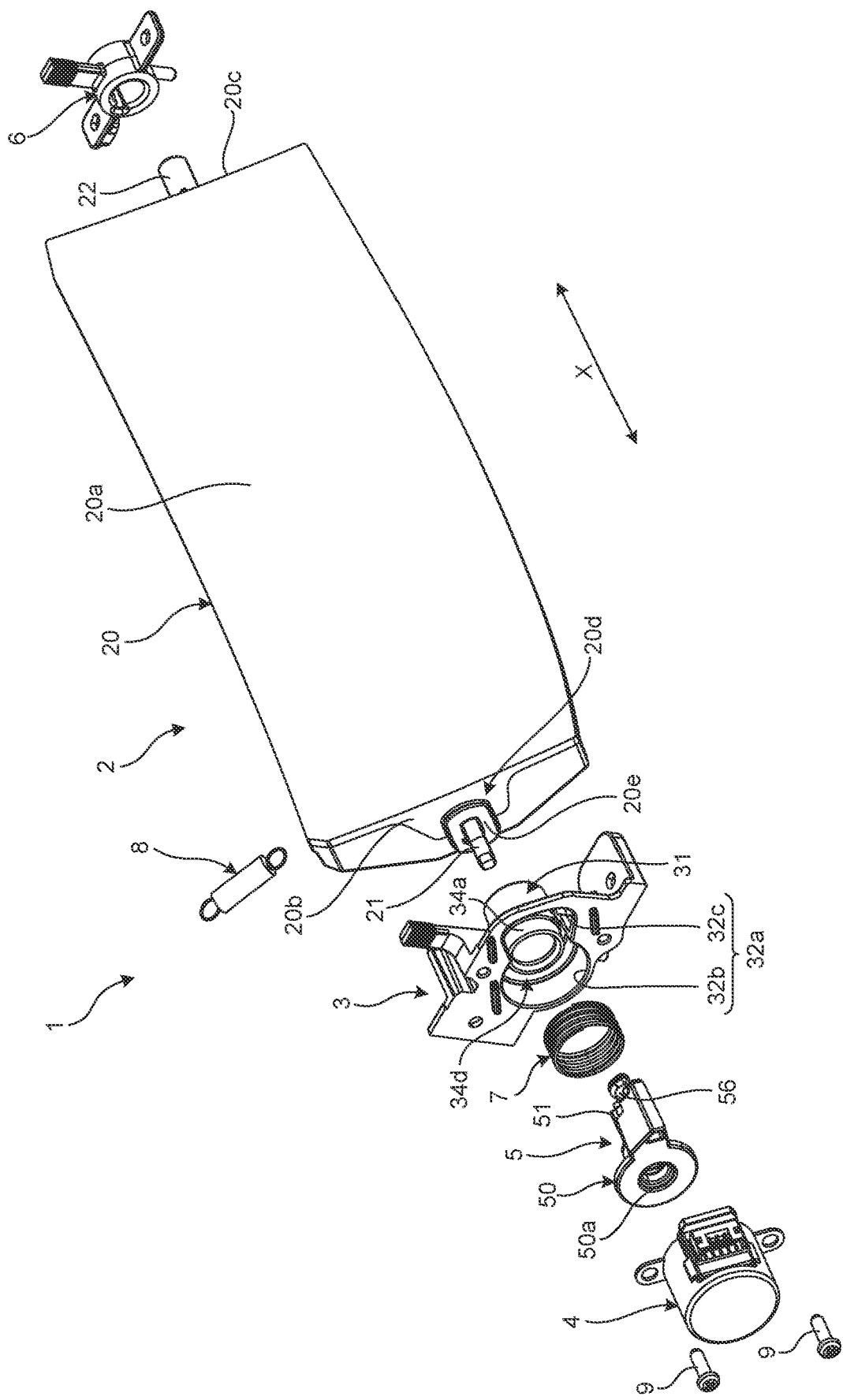
FIG. 3 is an exploded perspective view of the mirror device in the embodiment.
Figure 4:
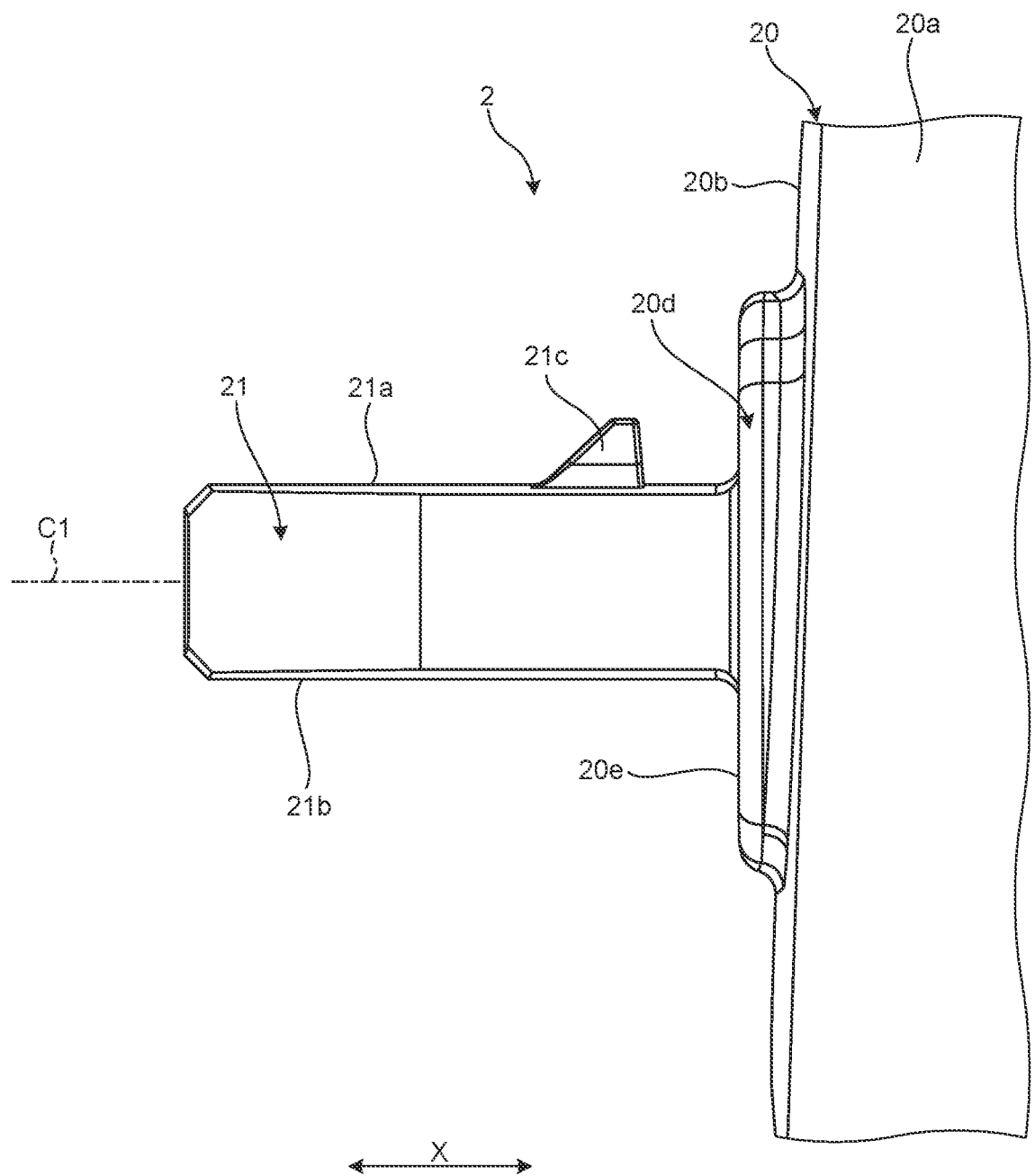
FIG. 4 is a front view illustrating an input shaft of a mirror in the embodiment.
Figure 5:
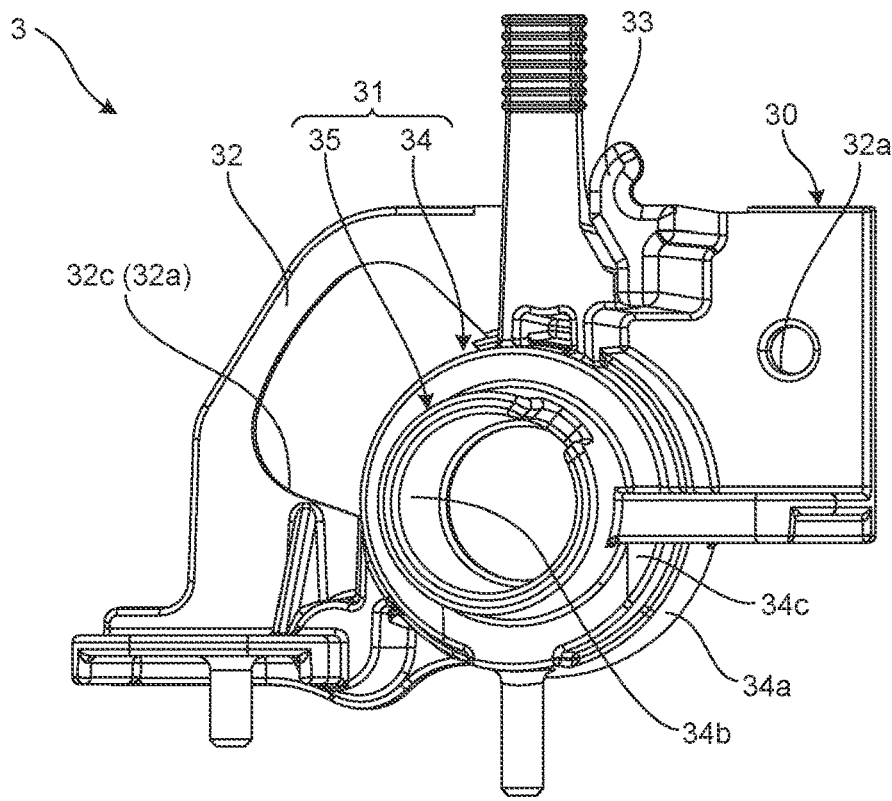
FIG. 5 is a perspective view illustrating a holding member of the embodiment.
Figure 6:
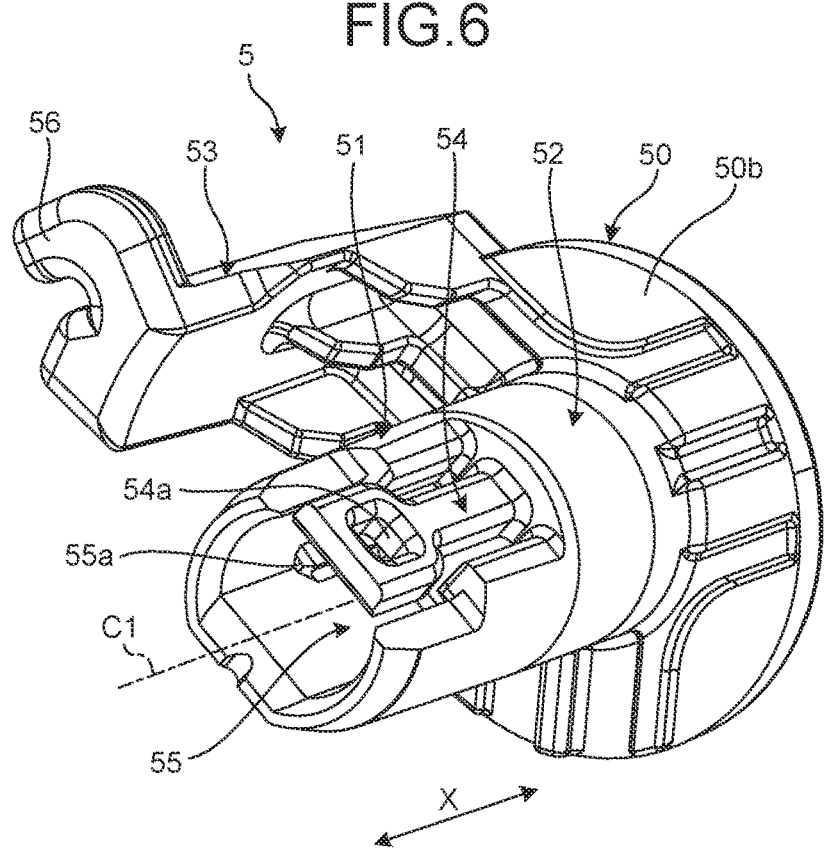
FIG. 6 is a perspective view illustrating a transmission member of the embodiment.
Figure 7:
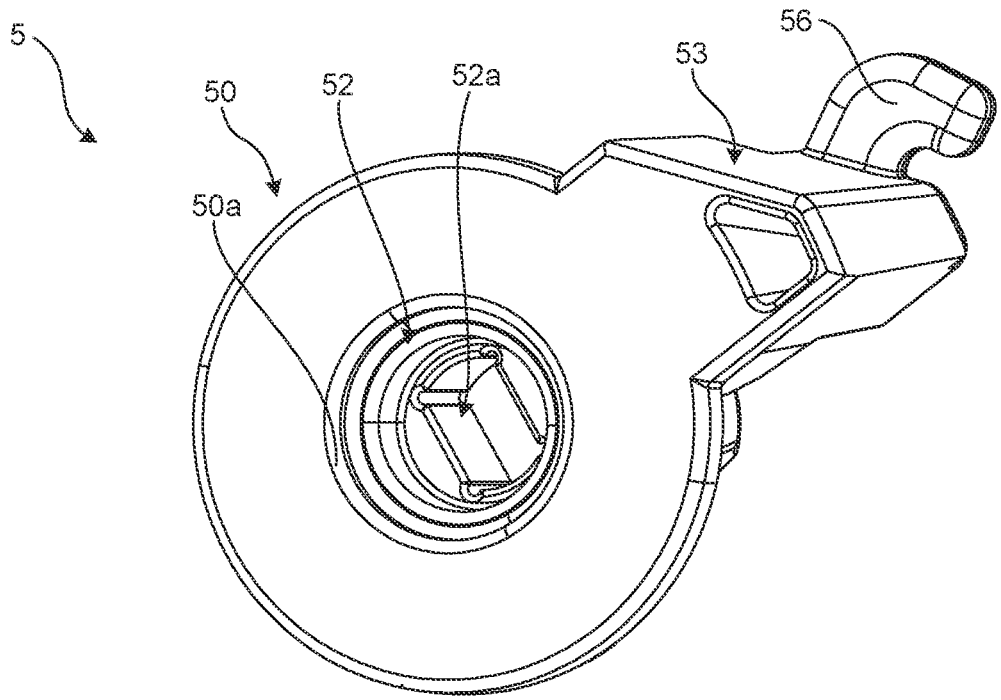
FIG. 7 is a perspective view illustrating the transmission member of the embodiment.
Figure 8:
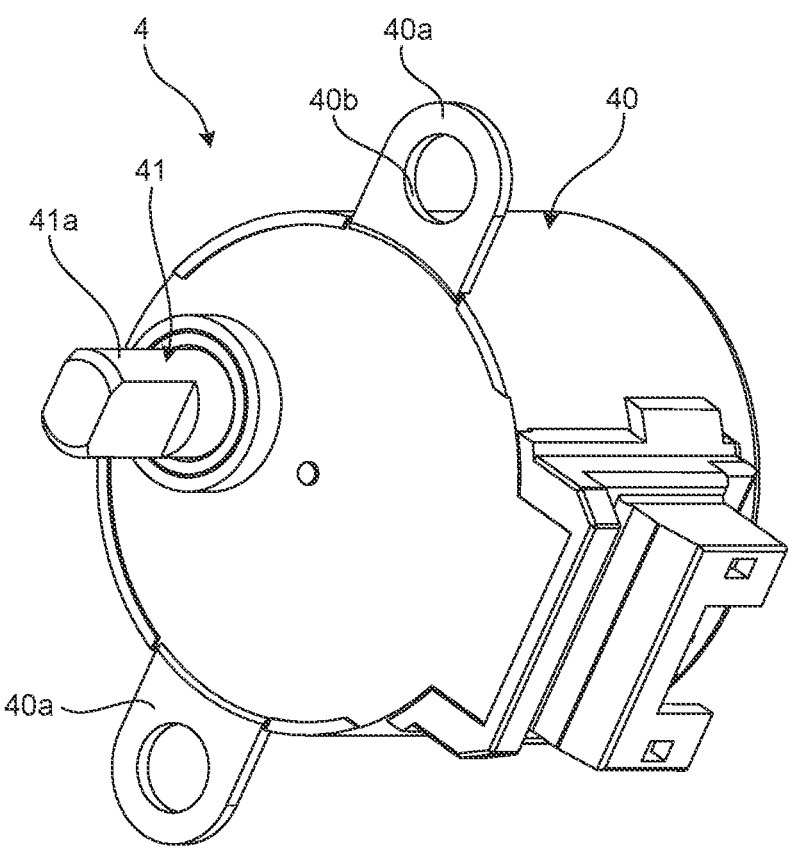
FIG. 8 is a perspective view illustrating a motor of the embodiment.
Figure 9:
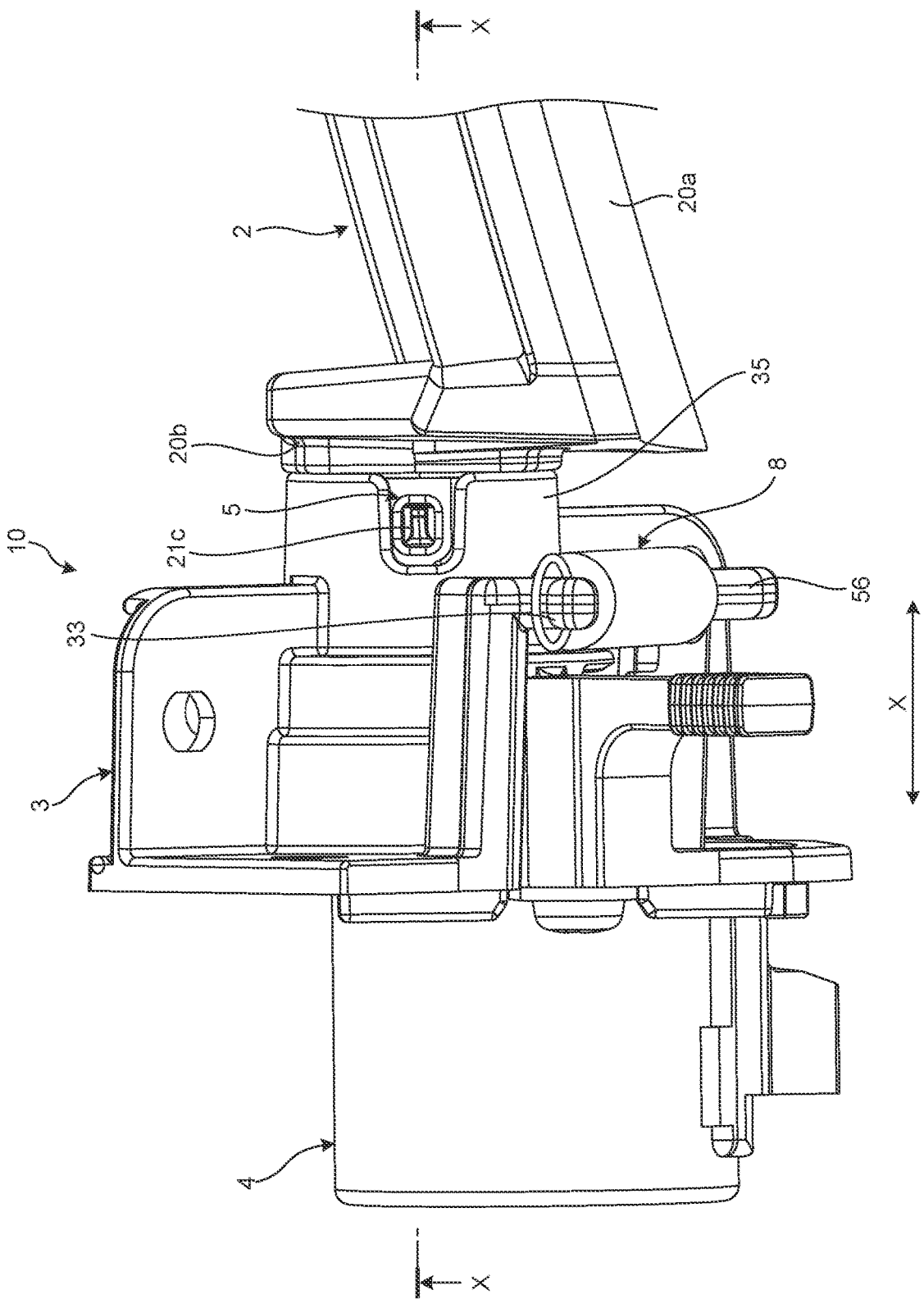
FIG. 9 is a plan view illustrating a principal portion of the head-up display device of the embodiment.
Figure 10:
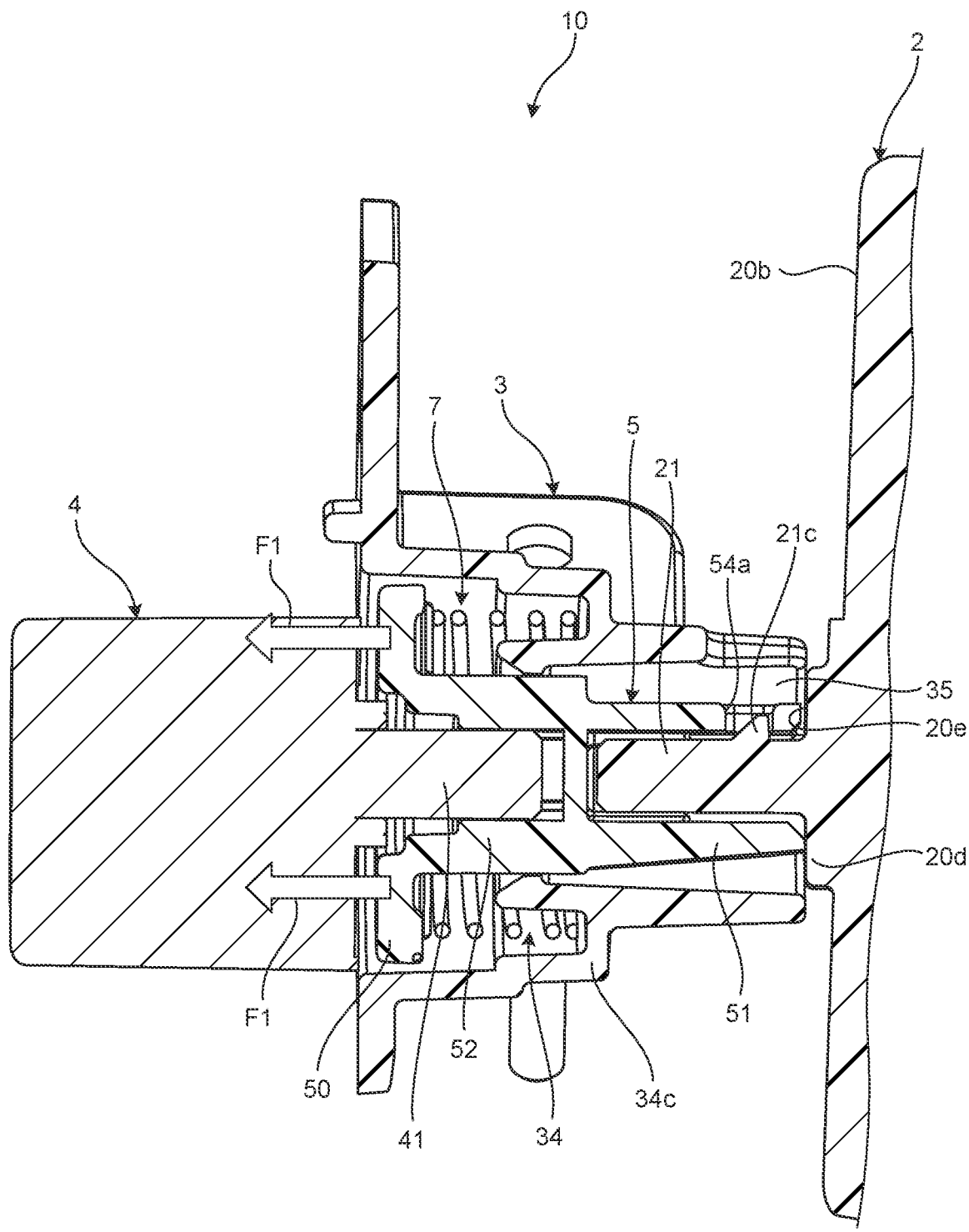
FIG. 10 is a cross-sectional view illustrating a principal portion of the head-up display device of the embodiment.

With reference to FIG. 1 to FIG. 10, the exemplary embodiment will be described. The present embodiment relates to a head-up display device. FIG. 1 is a diagram illustrating a vehicle in which a head-up display device of the embodiment is installed, FIG. 2 is a perspective view illustrating a mirror device of the embodiment, FIG. 3 is an exploded perspective view of the mirror device in the embodiment, FIG. 4 is a front view illustrating an input shaft of a mirror in the embodiment, FIG. 5 is a perspective view illustrating a holding member of the embodiment, FIG. 6 is a perspective view illustrating a transmission member of the embodiment, FIG. 7 is a perspective view illustrating the transmission member of the embodiment, FIG. 8 is a perspective view illustrating a motor of the embodiment, FIG. 9 is a plan view illustrating a principal portion of the head-up display device of the embodiment, and FIG. 10 is a cross-sectional view illustrating a principal portion of the head-up display device of the embodiment. In FIG. 10, the X-X cross-section in FIG. 9 is illustrated.

As illustrated in FIG. 1, a head-up display device 10 according to the embodiment is installed in a vehicle 100. The head-up display device 10 displays a virtual image 110 in front of an eye-point 201 of the vehicle 100. The eye-point 201 is a position that is predetermined as a viewpoint position of a driver 200 seated in a driver seat.

The head-up display device 10 is arranged on the inside of a dashboard 101 of the vehicle 100. On the upper surface of the dashboard 101, an opening 101a is provided. The head-up display device 10 projects an image on a windshield 102 via this opening 101a. The windshield 102 is a reflecting portion located in front of the eye-point 201 in the vehicle 100. The windshield 102 has semi-transparency and reflects display light DL that is incident from the head-up display device 10 toward the eye-point 201, for example. The driver 200 recognizes the image that is reflected by the windshield 102 as the virtual image 110. For the driver 200, the virtual image 110 is recognized as if being present in front relative to the windshield 102.

The head-up display device 10 has a mirror device 1, an image display device 11, and a housing 12. The image display device 11 is a device that outputs the display light DL and is a laser scanner and a liquid-crystal display device, for example. The mirror device 1 reflects the display light DL that is output from the image display device 11 toward the windshield 102. The mirror device 1 of the present embodiment is a movable mirror device capable of changing the orientation of a reflecting surface.

As illustrated in FIG. 2 and FIG. 3, the mirror device 1 has a mirror 2, a holding member 3, a motor 4, a transmission member 5, a bearing member 6, a first spring 7, and a second spring 8. The mirror 2 has, as illustrated in FIG. 3, a main unit 20, an input shaft 21, and a supported shaft 22. The main unit 20, the input shaft 21, and the supported shaft 22 are integrally molded by synthetic resin or the like. The main unit 20 has a reflecting surface 20a. The reflecting surface 20a is a concaved curved surface and enlarges the display light DL that is output from the image display device 11 and reflects it toward the windshield 102. The shape of the reflecting surface 20a of the present embodiment is a free surface. On the reflecting surface 20a, a reflecting layer may be formed by vapor deposition or the like.

The mirror 2 rotates with an axis line along the longitudinal direction of the mirror 2 as a rotation center. The main unit 20 has a first side surface 20b and a second side surface 20c. The first side surface 20b and the second side surface 20c are side surfaces facing in the longitudinal direction of the main unit 20. The first side surface 20b and the second side surface 20c face directions opposite to each other.

The input shaft 21 projects from the first side surface 20b. The input shaft 21 is a driven shaft that rotates by receiving the output torque of the motor 4. As illustrated in FIG. 3 and FIG. 4, the shape of the exemplified input shaft 21 is a plate-like shape or a rod-like shape. The input shaft 21 has a substantially rectangular cross-sectional shape. The input shaft 21 has a first surface 21a and a second surface 21b in parallel with each other. The input shaft 21 has an engaging protrusion 21c protruding from the first surface 21a. The engaging protrusion 21c restricts the input shaft 21 from slipping out from the transmission member 5. In the following description, the direction of the central axis line of the input shaft 21 is simply referred to as "axial direction X".

The supported shaft 22 projects from the second side surface 20c and is located coaxially with the input shaft 21. The supported shaft 22 is rotatably supported by the bearing member 6. The shape of the exemplified supported shaft 22 is columnar.

The first side surface 20b of the main unit 20 has a contact portion 20d that is provided on the base portion of the input shaft 21. The contact portion 20d is an annular raised portion surrounding the input shaft 21. The contact portion 20d has a contact surface 20e orthogonal to the axial direction X. The contact surface 20e comes into contact with a contact portion 35 of the holding member 3.

As illustrated in FIG. 3 and FIG. 5, the holding member 3 has a main unit 30 and a cylindrical portion 31. The main unit 30 and the cylindrical portion 31 are integrally molded by synthetic resin or the like. The main unit 30 is secured to the housing 12 by a fastening member such as a screw. The motor 4 is fixed to the main unit 30 and is supported by the main unit 30. The main unit 30 has a plate-like base portion 32 and a hook portion 33 projecting from the base portion 32. The base portion 32 has a substantially flat-plate shape and is orthogonal to the axial direction X.

The base portion 32 has a through-hole 32a that runs through the base portion 32 along the plate thickness direction. The through-hole 32a has, as illustrated in FIG. 3, an insertion opening 32b and a widened portion 32c. The insertion opening 32b is an opening into which the transmission member 5 is inserted and has a circular shape. The widened portion 32c is located on the outside in the radial direction with respect to the insertion opening 32b. The widened portion 32c is formed according to the rotation range of the mirror 2. A pillar portion 53 (see FIG. 6) of the transmission member 5 moves inside the widened portion 32c along the circumferential direction. The hook portion 33 is a portion to which one end of the second spring 8 is coupled. The exemplified hook portion 33 has a curved shape or a bent shape and is located on the outside in the radial direction with respect to the cylindrical portion 31.

The cylindrical portion 31 has a cylindrical shape and projects along the axial. direction X from the base portion 32. The cylindrical portion 31 has an accommodating portion 34 and the contact portion 35. The accommodating portion 34 is a portion on the root side of the cylindrical portion 31 and connects to the base portion 32. The contact portion 35 is a distal end portion of the cylindrical portion 31 and connects to the accommodating portion 34.

The accommodating portion 34 is a portion that accommodates the first spring 7. The accommodating portion 34 has an inner wall 34a, an outer wall 34b, and a bottom wall 34c. The shape of the inner wall 34a and the outer wall 34b is cylindrical. The inner diameter of the outer wall 34b is greater than the outer diameter of the inner wall 34a. Between the inner peripheral surface of the outer wall 34b and the outer peripheral surface of the inner wall 34a, an annular accommodating space 34d that accommodates the first spring 7 is formed (FIG. 3). The bottom wall 34c connects the distal end of the inner wall 34a and the distal end of the outer wall 34b and closes one end of the accommodating space 34d. The bottom wall 34c supports one end of the first spring 7 in the axial direction X. In other words, the bottom wall 34c supports the first spring 7 against the biasing force of the first spring 7.

The contact portion 35 projects along the axial direction X from the bottom wall 34c. The shape of the contact portion 35 is substantially cylindrical. The distal end face of the contact portion 35 is orthogonal to the axial direction X. On the distal end portion of the contact portion 35, a cutout is provided at a position corresponding to the engaging protrusion 21c of the mirror 2. The contact portion 35 comes into contact with the contact surface 20e of the mirror 2 and positions the mirror 2 in the axial direction X.

The transmission member 5 is a member that coaxially couples an output shaft 41 of the motor 4 and the input shaft 21 of the mirror 2. As illustrated in FIG. 6, the transmission member 5 has a base portion 50, a fitting portion 51, a coupling portion 52, a pillar portion 53, and an arm 54. The base portion 50, the fitting portion 51, the coupling portion 52, the pillar portion 53, and the arm 54 are integrally molded by synthetic resin or the like. The base portion 50 has an annular shape and is orthogonal to the axial direction X. As illustrated in FIG. 3, at the center of the base portion 50, an insertion opening 50a into which the output shaft of the motor 4 is inserted is provided.

As illustrated in FIG. 6, the fitting portion 51 and the coupling portion 52 are continuous along the axial direction X. In more detail, the coupling portion 52 projects along the axial direction X from a first surface 50b of the base portion

50. The first surface 50*b* is a surface facing the mirror 2 in the axial direction X. The fitting portion 51 projects along the axial direction X from the distal end of the coupling portion 52. The coupling portion 52 is a portion coupled with the output shaft 41 of the motor 4. As illustrated in FIG. 7, in the inner part of the coupling portion 52, a recessed portion 52*a* for which the cross-sectional shape is substantially rectangular is provided. The transmission member 5 receives the output torque of the motor 4 in the recessed portion 52*a*.

The fitting portion 51 is a portion to which the input shaft 21 of the mirror 2 is press-fitted. As illustrated in FIG. 6, the fitting portion 51 is formed in a cylindrical shape for which the cross-sectional shape is substantially C-shaped. In other words, the shape of the fitting portion 51 is a shape in which a slit is formed from the distal end to the base end with respect to a cylindrical tube. On the inside of the fitting portion 51, a recessed portion 55 to which the input shaft 21 is press fitted is formed. The cross-sectional shape of the recessed portion 55 at the cross-section orthogonal to the axial direction X is substantially rectangular. The recessed portion 55 sandwiches the first surface 21*a* and the second surface 21*b* of the input shaft 21. In the recessed portion 55, ribs 55*a* for reducing play that press the input shaft 21 are formed. One each of the rib 55*a* is arranged on both sides of the second surface 21*b* and extends in the axial direction X.

The arm 54 latches the engaging protrusion 21*c* of the input shaft 21. The arm 54 is located at the slit portion of the fitting portion 51. The arm 54 projects along the axial direction X from the distal end of the coupling portion 52. On the distal of the arm 54, an engaging hole 54*a* corresponding to the engaging protrusion 21*c* is provided. As illustrated in FIG. 7 and others, the pillar portion 53 projects along the axial direction X from the edge portion of the base portion 50. The pillar portion 53 is located on the outside in the radial direction with respect to the coupling portion 52 and the fitting portion 51 and faces the coupling portion 52 and the fitting portion 51 in the radial direction.

On the distal of the pillar portion 53, a projecting portion 56 to which the second spring 8 is fixed is formed. As illustrated in FIG. 6, the projecting portion 56 projects outward in the radial direction centering the central axis line C1. The central axis line C1 is a central axis line of the fitting portion 51 and is also a central axis line of the input shaft 21 of the mirror 2. The shape of the exemplified projecting portion 56 is a curved hook shape or a bent hook shape. The pillar portion 53 has high rigidity so that the amount of deformation with respect to the spring received from the second spring 8 is sufficiently reduced.

As illustrated in FIG. 8, the motor 4 has a main unit 40 and the output shaft 41. The motor 4 is a stepping motor, for example. The main unit 40 has fixing portions 40*a* that project outward. The fixing portion 40*a* is a portion that is fixed to the holding member 3 and has a through-hole 40*b*. The output shaft 41 projects from the main unit 40. The motor 4 outputs the motor torque generated in the main unit 40 from the output shaft 41. At the distal end portion of the output shaft 41, a transmission portion 41*a* for which the cross-sectional shape is substantially rectangular is provided. The transmission portion 41*a* is inserted into the recessed portion 52*a* of the transmission member 5. The shape of the transmission portion 41*a* is in a shape capable of transmitting the torque to the transmission member 5 and in a shape having a slight gap with the recessed portion 52*a* so as to be relatively movable in the axial direction X with respect to the recessed portion 52*a*. The transmission portion 41*a* of the present embodiment is configured so as to be slidable in the axial direction with respect to the recessed portion 52*a*. The output torque of the motor 4 is transmitted from the transmission portion 41*a* to the input shaft 21 of the mirror 2 via the transmission member 5.

As illustrated in FIG. 2 and FIG. 3, the bearing member 6 rotatably supports the supported shaft 22 of the mirror 2. The exemplified bearing member 6 is a slide bearing that supports the supported shaft 22 to be slidable. The bearing member 6 is secured to the housing 12.

The first spring 7 is an elastic spring and is a coil spring, for example. With reference to FIG. 3, an overall structure of the mirror device 1 will be described. The first spring 7 is accommodated in the accommodating space 34*d* of the holding member 3. The fitting portion 51 of the transmission member 5 is inserted into the cylindrical portion 31 of the holding member 3. The transmission member 5 is relatively rotatable with respect to the holding member 3. The input shaft 21 of the mirror 2 press-fitted to the fitting portion 51 of the transmission member 5. As the input shaft 21 is fitted in the fitting portion 51, the first spring 7 is sandwiched by the holding member 3 and the transmission member 5 and is compressed. In more detail, the first spring 7 is sandwiched by the bottom wall 34*c* of the holding member 3 and the base portion 50 of the transmission member 5. In other words, the first spring 7 is held in a state where one end in the axial direction X presses on the bottom wall 34*c* and the other end in the axial direction X presses on the base portion 50.

The motor 4 is fired to the holding member 3 while the output shaft 41 is being inserted into the transmission member 5. The motor 4 is fixed to the holding member 3 by male screws 9, for example. The input shaft 21 of the mirror 2 is supported by the housing 12 via the transmission member 5, the motor 4, and the holding member 3. The supported shaft 22 of the mirror 2 is supported by the housing 12 via the bearing member 6.

The second spring 8 is an elastic spring and is a coil spring, for example. Both ends of the second spring 8 have each a ring portion. As illustrated in FIG. 2, the ring portion on one end of the second spring 8 is hooked on the hook portion 33 of the holding member 3, and the ring portion on the other end of the second spring 8 is hooked on the projecting portion 56 of the transmission member 5. The second spring 8 is fixed to the holding member 3 and the transmission member 5 in an extended state. Thus, the second spring 8 exerts a pulling force on the projecting portion 56 toward the hook portion 33. The second spring 8 reduces the play between the input shaft 21 and the output shaft 41 in the rotational direction.

In FIG. 9 and FIG. 10, a state is illustrated where assembling of the mirror 2, the holding member 3, the motor 4, the transmission member 5, the first spring 7, and the second spring 8 is completed. As illustrated in FIG. 9, the hook portion 33 and the projecting portion 56 are located at the same position in the axial direction X. That is, the head-up display device 10 is configured so that, by the second spring 8, the force in the circumferential direction is exerted on the projecting portion 56 and the force in the axial direction X is not exerted. The input shaft 21 of the mirror 2 is press-fitted to the fitting portion 51 of the transmission member 5. Thus, the input shaft 21 is integrated with the transmission member 5. The engaging protrusion 21*c* of the mirror 2 is engaged with the engaging hole 54*a* or the transmission member 5. The output shaft 41 of the motor 4 is coaxially located on the extended line of the input shaft 21.

As illustrated in FIG. 10, the first spring 7 is squeezed between the bottom wall 34*c* of the holding member 3 and the base portion 50 of the transmission member 5. Thus, the first spring 7 imparts the biasing force F1 along the axial direction X to the transmission member 5. The biasing force F1 is The force oriented to bring the mirror 2 close to the output shaft 41. The biasing force F1 presses the transmission member 5 toward the main unit 40 of the motor 4. Thus, the torque transmission area between the output shaft 41 and the coupling portion 52 is appropriately ensured.

As in the foregoing, the head-up display device 10 of the present embodiment has the image display device 11, the mirror 2, the motor 4, the transmission member 5, the holding member 3, and the first spring 7. The image display device 11 is a device that outputs the display light DL of the image. The mirror 2 has the reflecting surface 20a and the input shaft 21 and is rotatable. The reflecting surface 20a reflects the display light DL toward the reflecting portion arranged in front of the driver 200. The motor 4 has the output shaft 41 located on the extended line of the input shaft 21 and rotates the output shaft 41.

The transmission member 5 has the fitting portion 51 and the coupling portion 52 and is a member that transmits the output torque of the motor 4 from the output shaft 41 to the input shaft 21. The fitting portion 51 is cylindrical and is a portion to which the input shaft 21 is press-fitted. The coupling portion 52 is a portion that is coupled with the output shaft 41. The holding member 3 is a member that holds the motor 4. The first spring 7 is a spring interposed between the holding member 3 and the transmission member 5. The first spring 7 imparts, to the transmission member 5, the biasing force F1 oriented to bring the mirror 2 close to the output shaft 41 along the axial direction X of the input shaft 21.

According to the head-up display device 10 of the present embodiment, the configuration of transmitting the torque from the motor 4 to the input shaft 21 of the mirror 2 is downsized. For example, arranging the output shaft 41 of the motor 4 and the input shaft 21 of the mirror 2 coaxially and in close proximity allows downsizing. In the present embodiment, as illustrated in FIG. 10, the output shaft 41 and the input shaft 21 are only partitioned by a thin wall. Thus, downsizing in the axial direction X is achieved. In addition, gears not being present between the output shaft 41 and the input shaft 21 allows the downsizing of the torque transmission structure. Moreover, the torque transmission structure not having gears increases the responsiveness in rotating the mirror 2.

In addition, the first spring 7 being interposed between the transmission member 5 and the holding member 3 allows downsizing of the mirror device 1. As a comparative example, in place of the first spring 7, a configuration is assumed in which a spring that presses the mirror 2 toward the motor 4 is arranged on the side of the bearing member 6. In the comparative example, the physical size of the mirror device 1 in the axial direction X is likely to increase. Meanwhile, the head-up display device 10 of the present embodiment allows the downsizing of the mirror device 1 in the axial direction X.

In the head-up display device 10 of the present embodiment, because the biasing force F1 of the first spring 7 does not directly act on the mirror 2, the deformation of the mirror 2 due to the biasing force F1 is not likely to arise. For example, as compared with a case where the first spring 7 directly contacts the mirror 2, the deformation such as distortion is not likely to occur on the reflecting surface 20a.

In the head-up display device 10 of the present embodiment, the mirror 2 has the main unit 20 having the reflecting surface 20a. The input shaft 21 projects from the first side surface 20b of the main unit 20. The holding member 3 has the hollow cylindrical portion 31 through which the transmission member 5 is inserted. The distal end of the cylindrical portion 31 has the contact portion 35 facing the first side surface 20b of the main unit 20 in the axial direction X. The first spring 7 makes the contact portion 35 contact the side surface 20b of the main unit 20 by the biasing force F1. Making the contact portion 35 contact the side surface 20b allows positioning of the mirror 2 in the axial direction X while suppressing the deformation of the mirror 2.

Note that, in the head-up display device 10 of the present embodiment, the contact portion 35 comes into contact with the contact portion 20d of the mirror 2. The contact portion 20d is a raised portion formed to surround the input shaft 21 and has high rigidity. Thus, the deformation of the reflecting surface 20a by the force received from the contact portion 35 is reduced.

The head-up display device 10 of the present embodiment has the second spring 8 that reduces the play in the rotational direction between the input shaft 21 and the output shaft 41. The transmission member 5 has the projecting portion 56 projecting outward in the radial direction centering the central axis line C1. The first end portion (end portion on one side) of the second spring 8 is coupled with the holding member 3 and the second end portion (end portion on the other side) of the second spring 8 is coupled with the projecting portion 56. With this configuration, the spring force of the second spring 8 is transmitted to the input shaft 21 via the transmission member 5. Thus, as compared with the configuration in which the spring force directly acts on the mirror 2, the deformation of the mirror 2 is not likely to arise.

The mirror device 1 of the present embodiment may be applied to devices different from the head-up display device 10. The mirror device 1 may be used for a projector and the like used in applications other than the vehicle, for example.

The shapes of the transmission member 5 and the holding member 3 are not limited to the exemplified shapes. For example, the shape and arrangement of the hook portion 33 of the holding member 3 are not limited to the exemplified shape and arrangement. For example, the shape and arrangement of the projecting portion 56 of the transmission member 5 are not limited to the exemplified shape and arrangement.

The content disclosed in the above-described embodiment can be implemented in combination as appropriate.

The head-up display device according to the present embodiment has the transmission member that has the cylindrical fitting portion to which the input axis of the mirror is press-fitted and the coupling portion coupled with the output shaft of the motor and transmitting the output torque of the motor from the output shaft to the input shaft, the holding member that holds the motor, and the first spring that is interposed between the holding member and the transmission member and imparts, to the transmission member, the biasing force oriented to bring the mirror close to the output shaft along the axial direction of the input shaft. According to the head-up display device in the present invention, it has an effect in that downsizing can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device comprising:
an image display device configured to output display light of an image;
a rotatable mirror having a reflecting surface configured to reflect the display light toward a reflecting portion arranged in front of a driver, and an input shaft;
a motor having an output shaft located on an extended line of the input shaft, the motor being configured to rotate the output shaft;
a transmission member having a cylindrical fitting portion to which the input shaft is press-fitted and a coupling portion coupled with the output shaft, the transmission member being configured to transmit output torque of the motor from the output shaft to the input shaft;
a holding member holding the motor; and
a first spring interposed between the holding member and the transmission member, the first spring being configured to impart, to the transmission member, a biasing force oriented to bring the mirror close to the output shaft along an axial direction of the input shaft,
wherein the cylindrical fitting portion and the coupling portion of the transmission member are integral and rotate in the same direction.

2. The head-up display device according to claim 1, wherein
the mirror has a main unit having the reflecting surface,
the input shaft projects from a side surface of the main unit,
the holding member has a hollow cylindrical portion through which the transmission member is inserted,
a distal end of the cylindrical portion has a contact portion facing the side surface of the main unit in the axial direction, and
the first spring makes the contact portion contact the side surface of the main unit by the biasing force.

3. The head-up display device according to claim 2, further comprising:
a second spring configured to reduce play in a rotational direction between the input shaft and the output shaft, wherein
the transmission member has a projecting portion projecting outward in a radial direction centering a central axis line of the input shaft, and
a first end portion of the second spring is coupled with the holding member and a second end portion of the second spring is coupled with the projecting portion.

4. The head-up display device according to claim 1, further comprising:
a second spring configured to reduce play in a rotational direction between the input shaft and the output shaft, wherein
the transmission member has a projecting portion projecting outward in a radial direction centering a central axis line of the input shaft, and
a first end portion of the second spring is coupled with the holding member and a second end portion of the second spring is coupled with the projecting portion.

* * * * *